UNITED STATES PATENT OFFICE.

JOHN V. DAVIS, OF HUNTINGTON, WEST VIRGINIA, ASSIGNOR OF ONE-THIRD TO FRANK B. ENSLOW, OF SAME PLACE.

PROCESS OF BOLTING AND PURIFYING FLOUR.

SPECIFICATION forming part of Letters Patent No. 347,326, dated August 17, 1886.

Application filed December 9, 1885. Serial No. 185,173. (No specimens.)

*To all whom it may concern:*

Be it known that I, JOHN V. DAVIS, a citizen of the United States, residing at Huntington, in the county of Cabell and State of West Virginia, have invented a new and Improved Process of Bolting and Purifying Flour; and I do hereby declare that the following is a full, clear, and exact description of the invention, which will be readily understood by others skilled in the business and art to which it appertains.

It is the common practice to bolt and purify flour by passing the meal or ground wheat into a revolving reel covered with cloth of a fine texture made for the purpose. The flour passes through the cloth-meshes in company with many specks of finely-ground bran and other impurities, which thus appear in it as brown and black or gray specks, such as may be seen in flour as it is usually marketed. These specks pass through the bolting-cloth by mechanical entanglement with the flour, or are forced and beaten through by the weight of the same. It is difficult to entirely free the flour of these impurities, and methods employed have, as a rule, been impracticable, owing to their complexity and consequent cost.

The object of my invention is to purify flour of all such foreign substances and impurities as the ordinary bolting does not eliminate, and to do this without materially increasing the cost of production, and without causing any appreciable decrease in weight or bulk; and to this end my invention consists in first bolting the crushed grain in the usual manner to remove the bulk of the impurities, then rebolting the flour as it comes from the bolt in company with some substance that will allow the flour to pass through the meshes of the cloth, and will detain the specks and impurities and cause them to pass off from the end of the reel.

To carry my invention into effect, I first bolt the crushed grain in the ordinary manner, which removes the bulk of the impurities, but leaves enough to render the flour as it comes from the bolt objectionable, as above stated. I then introduce this flour into a second or supplementary bolt, of construction similar to that of the first, and which can be easily understood from the description of this process. If the flour were thrown into the second reel alone, the cloth would clog, the meshes fill with flour, and the object of the process would be defeated.

I effect the desired end by mixing the flour, before introducing it into the second bolt, with coarse wheat bran. On entering the reel the bran permeates and lightens the mass of flour, and prevents clogging of the cloth. It is well known that the specific gravity of starch or pure flour is greater than bran, and upon this principle depends the efficiency of my process. The finely-ground bran specks and other impurities which are beaten through the first beating-cloth, are now allowed to work to the surface of the constantly-moving mass of bran and flour by reason of their lightness, and the flour is bolted through the cloth perfectly pure. The coarse bran, with the specks and impurities of all kinds, passes out of the end of the reel, where it is separated from the specks by a fine sieve attached to the end of the reel. The bran is returned to the other end of the bolt in a common conveyer, in which it is also mixed with the flour to be bolted, and is thrown again into the reel, the process thus being rendered continuous and the same bran used over and over again. The effect of the bran is twofold, as it prevents the flour from clogging the cloth, and thus defeating the object of the process, and also permeates the flour and lightens it, and allows the specks and impurities to rise to the surface and pass off, instead of being bolted through again.

I may use in the place of coarse wheat bran any substance of similar mechanical nature and characteristics, such as bran from rye or oats.

Among the striking advantages of my process is this, that the miller is allowed to grind as "close" as he may desire without chance of injury to the flour, as, no matter how much of the bran is ground fine, it is all removed in the second bolting, and all the starch and gluten are removed from the grain and none carried off with the bran and specks; hence the tailings do not require to be rebolted, thus saving much time, labor, and expense. The miller may thus increase the yield of flour, and at the same time make it of much better quality; also, expensive wheat-cleaning machinery is not necessary when my process is used, as at present, because, even if impure substances are ground with the wheat, they will all be removed by the second bolting. The miller is allowed to make all of his flour of a uniform grade of a high character and perfectly white and pure. Thus the effect of my invention is to make a uniformly high grade of pure white flour of all kinds of wheat, rendering the product more valuable in fact and greater in quantity without materially increasing the cost of production.

To more clearly define the art to which my improvement relates, I will state that it has been proposed to mix bran or crushed grain with wheat meal or flour prior to bolting the latter, for the purpose of cooling such meal and preventing it from becoming attached to and clogging the meshes of the bolting-cloth; but so far as I am aware it has never been proposed to first bolt the crushed grain to remove the bulk of the impurities, then rebolt the flour thus obtained mixed with bran, so that all the impurities are removed, all the starch and gluten extracted from the grain, and the further bolting of the tailings dispensed with.

What I claim is—

As an improvement in the art of manufacturing flour, the process described, which consists in first bolting the crushed grain to remove the bulk of the impurities, then mixing with the flour thus produced a sufficient amount of coarse bran, and next bolting said mixture, whereby all the valuable constituents of the grain are extracted therefrom, all the impurities removed from the flour, and the bolting of the tailings dispensed with, as set forth.

J. V. DAVIS.

Witnesses:
E. B. ENSLOW,
T. E. STOUT.